(12) United States Patent
Itabashi et al.

(10) Patent No.: US 11,616,886 B2
(45) Date of Patent: Mar. 28, 2023

(54) IMAGE FORMATION APPARATUS

(71) Applicant: CANON KABUSHIKI KAISHA, Tokyo (JP)

(72) Inventors: Toshifumi Itabashi, Ibaraki (JP); Hiroto Koga, Chiba (JP); Hiroyuki Nakagawa, Chiba (JP); Ryo Hashizume, Chiba (JP); Sho Ota, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/579,453

(22) Filed: Jan. 19, 2022

(65) Prior Publication Data

US 2022/0239793 A1  Jul. 28, 2022

(30) Foreign Application Priority Data

Jan. 28, 2021  (JP) .............................. JP2021-012467

(51) Int. Cl.
*H04N 1/00* (2006.01)

(52) U.S. Cl.
CPC ..... *H04N 1/00615* (2013.01); *H04N 1/00602* (2013.01)

(58) Field of Classification Search
CPC ............ B65H 2220/01; B65H 2801/06; B65H 2220/02; B65H 1/04; B65H 3/48; B65H 2511/20; B65H 3/0684; B65H 3/5261; B65H 1/266; B65H 1/14; B65H 2220/03; B65H 2405/324; B65H 2407/21; B65H 3/06; B65H 1/08; B65H 2511/51; B65H 2220/09; B65H 3/0669; B65H 7/04; B65H 2220/04; B65H 2220/11; B65H 2553/414; B65H 3/128; B65H 7/14; B65H 2403/732; B65H 2511/12; B65H 3/66;
(Continued)

(56) References Cited

U.S. PATENT DOCUMENTS 8,078,085 B2 * 12/2011 Okabe ................ G03G 21/1853
                                                        399/177
8,364,075 B2 *  1/2013 Adam ................... H04W 40/22
                                                        455/13.1
(Continued)

FOREIGN PATENT DOCUMENTS

JP         2019155610 A       9/2019
JP         2020183309 A      11/2020

*Primary Examiner* — Negussie Worku
(74) *Attorney, Agent, or Firm* — Canon U.S.A., Inc. I.P. Division (57) ABSTRACT

An image formation apparatus to form an image on a sheet having a width direction includes a separation and feed roller pair having a feed roller, a conveyance roller pair having a driving roller, and a pair of conveyance guides having inner and outer guides. A part of the inner guide overhangs toward an outer guide side from an external common tangent of the feed roller and the driving roller. Points of intersection with the feed roller on the external common tangent are designated as first intersection points and points of intersection with the driving roller on the external common tangent are designated as second intersection points. When ends of the feed and driving rollers serve as vertexes, a guide surface of the inner guide is linearly continuous in the width direction in an inner region on the guide surface of the inner guide formed by connecting the vertexes.

6 Claims, 6 Drawing Sheets

(58) Field of Classification Search
CPC ............ B65H 2407/30; B65H 2511/11; B65H 2511/22; B65H 2511/414; B65H 2513/51; B65H 2513/52; B65H 2515/60; B65H 2553/45; B65H 2220/08; B65H 2403/42; B65H 2405/114; B65H 2513/41; B65H 2513/512; B65H 7/00; B65H 2301/5321; B65H 2404/144; B65H 2405/11163; B65H 2406/121; B65H 2511/514; B65H 2515/34; B65H 2551/20; B65H 2601/324; B65H 2701/1313; B65H 3/0607; B65H 3/0638; B65H 3/0676; B65H 5/06; B65H 5/062; B65H 5/38; B65H 7/02; B65H 7/18; B65H 1/00; B65H 1/12; B65H 2402/441; B65H 2402/442; B65H 2403/40; B65H 2403/724; B65H 2404/1442; B65H 2404/73; B65H 2405/121; B65H 2405/31; B65H 2405/332; B65H 2511/515; B65H 2511/52; B65H 2515/30; B65H 2553/41; B65H 2553/412; B65H 2553/82; B65H 2557/12; B65H 2601/422; B65H 2701/18282; B65H 2801/03; B65H 3/46; B65H 3/68; B65H 39/042; B65H 1/027; B65H 11/00; B65H 15/00; B65H 2301/331; B65H 2301/4452; B65H 2402/10; B65H 2402/31; B65H 2402/54; B65H 2403/00; B65H 2403/513; B65H 2403/722; B65H 2404/14; B65H 2404/143; B65H 2404/15; B65H 2404/152; B65H 2404/1521; B65H 2404/16; B65H 2404/5214; B65H 2404/60; B65H 2404/6111; B65H 2404/69; B65H 2404/6942; B65H 2405/1111; B65H 2405/111646; B65H 2405/112; B65H 2405/1136; B65H 2405/13; B65H 2405/141; B65H 2405/15; B65H 2405/321; B65H 2406/3662; B65H 2406/41; B65H 2511/10; B65H 2511/13; B65H 2511/21; B65H 2511/212; B65H 2511/224; B65H 2511/416; B65H 2511/524; B65H 2511/528; B65H 2513/10; B65H 2515/10; B65H 2515/32; B65H 2515/81; B65H 2553/61; B65H 2553/81; B65H 2701/1125; B65H 2701/11312; B65H 2701/1311; B65H 2801/12; B65H 3/00; B65H 3/0816; B65H 3/44; B65H 43/02; B65H 5/068; B65H 5/36; B65H 7/08; B65H 9/004; B65H 9/006; B65H 9/06; B65H 9/166; B65H 2301/363; B65H 2403/41; B65H 2405/1113; B65H 2515/40; B65H 2515/70; B65H 2515/805; B65H 2551/29; B65H 2553/80; B65H 2601/325; B65H 9/00; H04N 19/00; H04N 1/00602; H04N 1/0464; H04N 1/195; H04N 1/00588; H04N 1/00596; H04N 1/00615; H04N 1/00652; H04N 1/0313; H04N 1/0316; H04N 1/1013; H04N 1/1017; H04N 1/1215; H04N 1/125; H04N 1/19; H04N 2201/0434; H04N 2201/0436; H04N 1/193; H04N 2201/0458; H04N 1/00543; H04N 1/0062; H04N 1/00628; G09G 5/08; G03G 15/6529; G03G 15/6511; G03G 15/6514; G03G 15/6502; G03G 15/5029; G03G 2215/00679; G03G 15/00; G03G 15/602; G03G 15/607; G03G 15/65; G03G 15/6555; G03G 21/1633; G03G 2215/0054; G03G 2215/00544; G03G 2215/0132; G03G 2221/1675; G03G 2221/169; G03G 15/2028; G03G 15/55; G03G 15/6532; G03G 15/6564; G03G 15/6567; G03G 15/657; G03G 15/70; G03G 21/00; G03G 21/1647; G03G 21/1695; G03G 21/203; G03G 21/206; G03G 2215/00396; G03G 2215/00468; G03G 2215/00751; G03G 2215/00776; G03G 15/0806; G03G 15/50; G03G 15/5016; G03G 15/6558; G03G 21/0011; G03G 2215/00383; G03G 9/1075; G03G 9/1131; G03G 9/1132; G03G 9/1139

See application file for complete search history.

(56) References Cited

U.S. PATENT DOCUMENTS

| | | | |
|---|---|---|---|
| 9,400,450 B2* | 7/2016 | Kikuchi | G03G 15/0865 |
| 2006/0237894 A1* | 10/2006 | Nagasaki | B65H 3/54 |
| | | | 271/10.01 |
| 2008/0030809 A1* | 2/2008 | Itabashi | B65H 7/14 |
| | | | 271/111 |
| 2014/0125002 A1* | 5/2014 | Itabashi | B65H 7/00 |
| | | | 271/10.16 |
| 2021/0198068 A1* | 7/2021 | Aikawa | B65H 3/14 |
| 2021/0373467 A1* | 12/2021 | Hayashi | B65H 29/12 |
| 2022/0244672 A1* | 8/2022 | Takahashi | B65H 1/00 |
| 2022/0260943 A1* | 8/2022 | Ota | G03G 15/2028 |

* cited by examiner

IMAGE FORMATION APPARATUS

BACKGROUND

Field

The present disclosure relates to an image formation apparatus that forms images on a sheet.

Description of the Related Art

Image formation apparatuses, such as copying machines, printers, and facsimiles, have a plurality of conveyance roller pairs arranged in a conveyance path from a sheet container for containing sheets to an image formation unit. The image formation apparatus in Japanese Patent Application Laid-Open No. 2020-183309 has a plurality of roller pairs, such as a pickup roller pair that feeds sheets stored in the container, a separate and feed roller pair that separates sheets fed by the pickup roller one by one, a conveyance roller pair that conveys the sheet separated by the separation and feed roller pair, and a registration roller pair that conveys the sheet to the image formation unit.

In many cases, the conveyance path between the separation and feed roller pair and the conveyance roller pair is not straight but is curved due to the structure of the image formation apparatus. To convey the sheets along such a curved conveyance path, the conveyance resistance to sheets tends to increase as compared to the straight conveyance path.

In the image formation apparatus discussed in Japanese Patent Application Laid-Open No. 2020-183309, the inner guide in the curved conveyance path is arranged on the inner peripheral side beyond an external common tangent L1 of the separation and feed roller pair and the conveyance roller pair to prevent contact of the sheet with the inner guide during conveyance of the sheet by the separation and feed roller pair and the conveyance roller pair. This controls an increase in the conveyance resistance to the sheet.

In other words, in the configuration of Japanese Patent Application Laid-Open No. 2020-183309, the inner guide needs to be greatly retracted to the inside of the curved conveyance path. On the other hand, the outer guide needs to be gently curved to control the conveyance resistance for the conveyance of thick and high-stiffness sheets.

However, in the configuration of Japanese Patent Application Laid-Open No. 2020-183309, the gap between the inner guide and the outer guide constituting the conveyance path is large so that thin and low-stiffness sheets might become buckled during conveyance.

SUMMARY

The present disclosure is directed to controlling an increase in the conveyance resistance in guides in conveying sheets and improving the ease of sheet conveyance, regardless of the stiffness of sheets.

According to an aspect of the present disclosure, an image formation apparatus includes an image formation unit configured to form an image on a sheet, a separation and feed roller pair configured to separate a plurality of sheets contained in a container one by one and feed the separated sheet, a conveyance roller pair configured to convey the sheet delivered from the separation and feed roller pair to the image formation unit, and a pair of conveyance guides disposed between the separation and feed roller pair and the conveyance roller pair in a sheet conveyance direction and forming a curved conveyance path for guiding the sheet, wherein the pair of conveyance guides has an inner guide arranged on an inner peripheral side of the curved conveyance path and an outer guide arranged on an outer peripheral side of the curved conveyance path, wherein the separation and feed roller pair has a feed roller arranged on the inner guide side of the curved conveyance path and configured to feed the sheet and a separation roller arranged on the outer guide side of the curved conveyance path and configured to contact the feed roller, separate the plurality of sheets one by one, and convey a sheet separated one by one, wherein the conveyance roller pair has a driving roller arranged on the inner guide side of the curved conveyance path and configured to be driven by a drive source and a driven roller arranged on the outer guide side of the curved conveyance path and configured to contact the driving roller and follow rotation of the driving roller, wherein, when viewed from a width direction of the sheet orthogonal to the sheet conveyance direction, a part of the inner guide overhangs toward the outer guide side from an external common tangent of the driving roller and the feed roller, wherein, when viewed from the width direction of the sheet orthogonal to the sheet conveyance direction, points of intersection with the feed roller on the external common tangent are designated as first intersection points and points of intersection with the driving roller on the external common tangent are designated as second intersection points, and wherein, when viewed from the sheet conveyance direction and when both ends of the feed roller at the second intersection points in the width direction and both ends of the driving roller at the first intersection points in the width direction serve as vertexes, in an inner region on a guide surface of the inner guide formed by connecting the vertexes, the guide surface of the inner guide is linearly continuous in the width direction.

Further features of the present disclosure will become apparent from the following description of exemplary embodiments with reference to the attached drawings.

DESCRIPTION OF THE EMBODIMENTS

Figure 1:
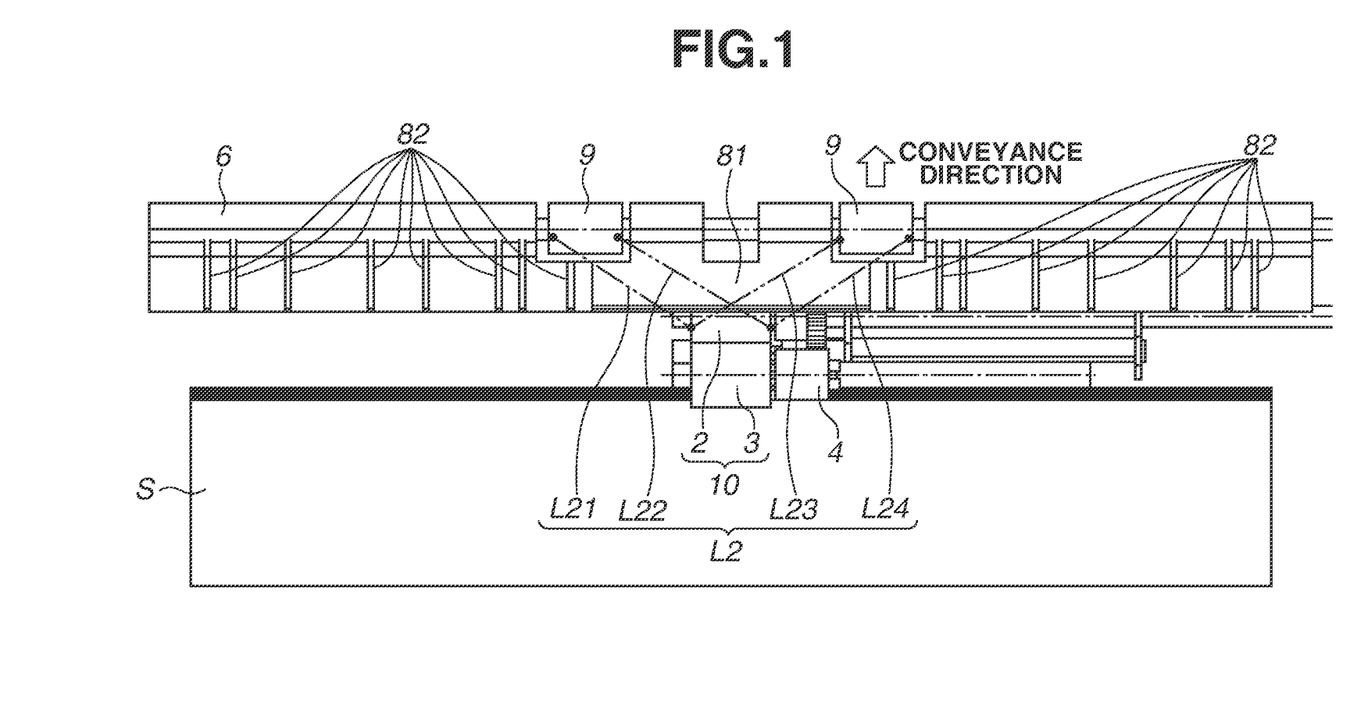
FIG. 1 is a side view of a surface guide and rib configuration according to a first exemplary embodiment.

A configuration of exemplary embodiments of the present disclosure will be described with reference to FIGS. 6, 1, and 2.

[Image Formation Apparatus]

Figure 6:
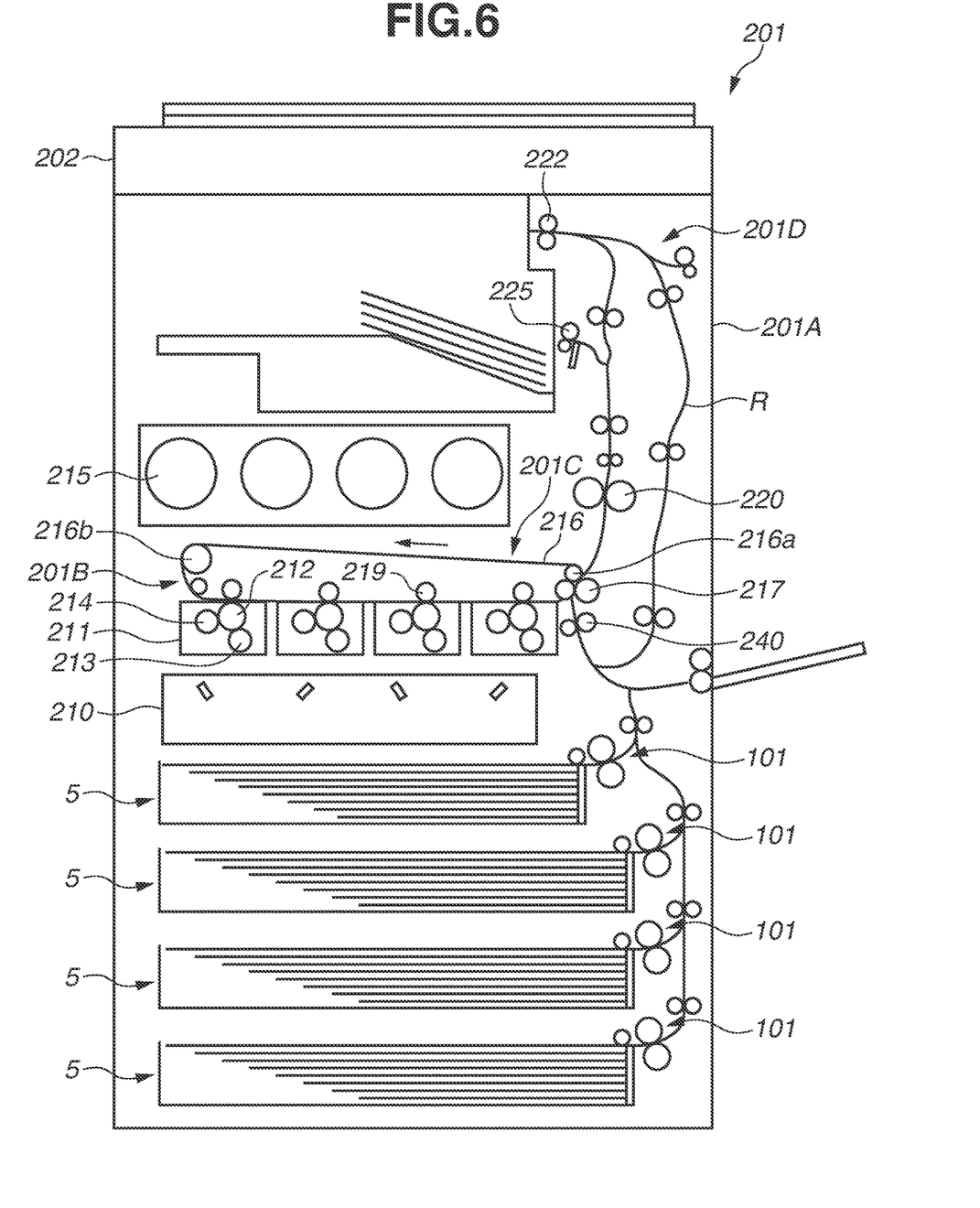
FIG. 6 is an image formation apparatus according to the first and second exemplary embodiments.

FIG. 6 is a diagram illustrating a schematic configuration of an image formation apparatus 201 according to an exemplary embodiment of the present disclosure. In FIG. 6, the image formation apparatus 201 is a full-color laser beam copying machine and includes a printer main body 201A, which is a main body of the image formation apparatus, an image formation unit 201B and a fixing unit 220, which are stored in the printer main body 201A, and other members. An image reading device 202 is placed substantially horizontally in the upper part of the printer main body 201A, and an ejection space to which sheets with images formed thereon are ejected is formed between the image reading device 202 and the printer main body 201A. A sheet feed device including sheet feed units 101 is arranged in the lower part of the printer main body 201A.

The image formation unit 201B is of a four-drum full-color type, which includes a laser scanner 210 and four process cartridges 211 that form toner images in four colors, yellow (Y), magenta (M), cyan (C), and black (K). Each of the process cartridges 211 includes a photoconductive drum 212, a charger 213 serving as a charging unit, a developer 214 serving as a development unit, and a cleaner serving as a cleaning unit. The image formation unit 201B includes an intermediate transfer unit 201C that is disposed above the process cartridges 211.

The intermediate transfer unit 201C includes an intermediate transfer belt 216 that is wound around a drive roller 216a and a tension roller 216b. The intermediate transfer belt 216 is arranged to be in contact with the photoconductive drums 212 and is rotated in a direction of the arrow by the drive roller 216a driven by the drive unit. The intermediate transfer unit 201C is provided inside the intermediate transfer belt 216 and includes primary transfer rollers 219 which abuts on the intermediate transfer belt 216 at positions facing the photoconductive drums 212. A secondary transfer roller 217 is provided at a position facing the drive roller 216a of the intermediate transfer unit 201C. The secondary transfer roller 217 forms a secondary transfer unit that transfers a color image formed on the intermediate transfer belt 216 onto the sheet. Toner cartridges 215 storing the toner of the corresponding colors are provided above the intermediate transfer unit 201C.

Applying a positive polarity transfer bias to the intermediate transfer belt 216 using the primary transfer rollers 219 transfers the toner image of the corresponding color having a negative polarity on the photoconductive drums 212 onto the intermediate transfer belt 216 in an overlaying manner.

The sheet fed by the sheet feed device is conveyed to a registration roller pair 240, and this registration roller pair 240 corrects a skew of the sheet. The sheet is then conveyed by the registration roller pair 240 to a secondary transfer unit at a timing when the color image formed on the intermediate transfer belt 216 and the leading end of the sheet align with each other, and the toner image on the intermediate transfer belt 216 is transferred onto the sheet.

The sheet onto which the toner image has been transferred is heated and pressed by the fixing unit 220 so that the toner image is fixed as a color image to the sheet. The sheet P with the image fixed thereto is ejected by an ejection roller pair 225 to the ejection space and stacked therein. In forming images on both sides of the sheet, after the fixation of an image on one side, the sheet P is conveyed to a re-conveyance path R by a reverse roller pair 222 that is capable of forward reverse and provided at a two-side reverse unit 201D, and then conveyed again to the image formation unit 201B.

[Sheet Feed Unit]

The sheet feed units 101 for feeding sheets will be described. The respective sheet feed unit 101 includes a pickup roller 1 which picks up sheets S stored in a sheet container 5, a feed roller 2 which conveys the picked-up sheets S, and a retard roller 3 which faces the feed roller 2, separates a plurality of sheets S one by one, and feeds the sheet S. In the following description, a roller pair of the feed roller 2 and the retard roller 3 may be collectively referred to as "separation conveyance roller pair 10".

A first exemplary embodiment of the present disclosure will be described below. The sheet container 5 includes side regulation plates and a trailing end regulation plate for regulating the side end positions and trailing end position of the set sheets, and an intermediate plate that raises a bundle of the set sheets to a position at which the sheet feed unit 101 is able to transport the sheets S. The pickup roller 1 is pressurized toward the top of the sheets S contained in the sheet container 5, and rotated by transfer of a drive force from the feed motor. The rotation of the pickup roller 1 feeds the sheets S toward a separation nip formed by the feed roller 2 and the retard roller 3.

A drive transfer force (limit value) of a torque limiter 4 is always set to a value higher than a friction force that occurs between sheets to be used in accordance with a friction coefficient between the sheets. The drive transfer force (limit value) of the torque limiter 4 is set to a value smaller than a friction force in accordance with a friction coefficient between the sheet and the feed roller 2. Thus, in a case where one or no sheet S is entered into the separation nip of the feed roller 2 and the retard roller 3, the retard roller 3 is dragged by the feed roller 2. In a case where two or more sheets are entered into the nip, the retard roller 3 rotates in the direction opposite to a sheet conveyance direction to separate the sheets S one by one.

The feed roller 2 is rotated by transfer of the drive force from the feed motor.

The sheet fed by the feed roller 2 is conveyed along a curved conveyance path described below, and then delivered to withdrawal conveyance roller pairs 9. The sheet delivered to the withdrawal conveyance roller pairs 9 is further conveyed to a registration roller pair 240 downstream in the conveyance direction.

Next, the curved conveyance path provided between the separation conveyance roller pair 10 and the withdrawal conveyance roller pairs 9, which is a characteristic part of the present exemplary embodiment, will be described with reference to FIGS. 1 to 3. As illustrated in FIG. 2, the curved conveyance path is provided between the separation conveyance roller pair 10 (the feed roller 2 and the retard roller 3) and the withdrawal conveyance roller pairs 9. The separation conveyance roller pair 10 is a roller pair of the feed roller 2 and the retard roller 3 described above. The withdrawal conveyance roller pairs 9 are each formed by a withdrawal driving roller 91 and a withdrawal driven roller 92. The curved conveyance path is formed by an inner guide 6 and an outer guide 7, which are a pair of guide members, and is used for conveying sheets fed from the sheet container 5 to the image formation unit 201B. The inner guide 6 is a guide member arranged on the inner peripheral side of the curved conveyance path and has an inner guide overhang part 8 described below in conjunction with FIG. 3.

The outer guide 7 is a guide member that faces the inner guide 6 and is arranged on the outer peripheral side of the curved conveyance path. The feed roller 2 is located on the inner guide side of the curved conveyance path and located upstream in the conveyance direction. The withdrawal driving roller 91 is located on the inner guide side of the curved conveyance path and located downstream in the conveyance direction. The retard roller 3 is located on the outer guide side of the curved conveyance path and located upstream in the conveyance direction. The withdrawal driven roller 92 is located on the outer guide side of the curved conveyance path and located downstream in the conveyance direction.

As described above, the inner guide 6 forming the curved conveyance path has the inner guide overhang part 8. The inner guide overhang part 8 is a part that protrudes toward the outer guide 7 beyond a straight line L1 that is an external common tangent of the feed roller 2 and the withdrawal driving roller 91 (see FIG. 2). The shape of the inner guide overhang part 8 will be described in detail with reference to FIGS. 3 and 4. The straight line L1 in FIG. 2 will be called the external common line of the feed roller 2 and the withdrawal driving roller 91. Strictly speaking, there can be two external common tangents of the feed roller 2 and the withdrawal driving roller 91. In the present exemplary embodiment, however, the "external common tangent L1" refers to, of the two external common tangents, the external common tangent closer to the outer guide of the curved conveyance path.

The inner guide overhang part 8 is a part formed in the inner guide 6 to provide an appropriate guide gap between the inner guide 6 and the opposing outer guide 7 along the entire sheet width. The inner guide overhang part 8 is formed in the inner guide 6 for the following reason. In a case where a sheet to be conveyed is thin and has a low-stiffness, the leading end of the sheet conveyed from the feed roller 2 to the withdrawal conveyance roller pairs 9 may not go along the outer guide 7 because the leading end of the thin sheet is not stabled in orientation due to its low stiffness. If the orientation of the leading end of the thin sheet is unstable, the leading end of the sheet may be bent or deformed in the guide gap between the inner guide 6 and the outer guide 7, so that a conveyance failure and/or rotation of the sheet with respect to the sheet conveyance direction are/is likely to occur.

Thus, in the present exemplary embodiment, the inner guide overhang part 8 is formed in the inner guide 6 along the entire sheet width (see FIGS. 2 and 3) in order to appropriately narrow the guide gap. This configuration enables sheets to be conveyed along the curved conveyance path without deformation of sheets, such as folding or bending. To improve geometrical characteristics, the sheet is to be conveyed with a control of a change in the orientation of the sheet. Thus, appropriately narrowing the guide gap along the entire sheet width enables the sheets to be conveyed with the control of a change in the orientation of the sheet.

Providing the inner guide overhang part 8 enables the control of a change in the orientation of a thin sheet during conveyance as well as enhancement in geometrical characteristics. On the other hand, the sheet S becomes likely to contact the guide, which leads to an increase in the conveyance resistance.

Thus, in the present exemplary embodiment, in order to control an increase in the conveyance resistance along with the narrowing of the guide gap, the inner guide overhang part 8 is provided such that a plurality of ribs extending in the conveyance direction is arranged at appropriate intervals in a sheet width direction. Forming the plurality of ribs extending in the conveyance direction in the inner guide 6 decreases the area in which inner guide 6 contacts the sheet.

When the sheet that is being sandwiched between the separation conveyance roller pair 10 and the withdrawal conveyance roller pairs 9 is conveyed, the sheet is pulled by the withdrawal conveyance roller pairs 9 with respect to the separation conveyance roller pair 10. This is because the conveyance resistance is applied to the separation conveyance roller pair 10 by the retard roller 3 by the action of the torque limiter 4 and the drive force on the separation conveyance roller pair 10 is cut earlier than that on the withdrawal conveyance roller pairs 9. Thus, a tension is applied to the conveyed sheet S due to the pulling of the sheet by the downstream withdrawal conveyance roller pairs 9, and thus the sheet S is conveyed while being in contact with the inner guide 6 (strictly, the inner guide overhang part 8).

The contact pressure at the part of the sheet in contact with the inner guide 6 per unit area becomes higher as the contact area becomes smaller. Depending on the type of the sheet, recesses, scratches, changes in roughness, and the like (changes in sheet surface texture) in the conveyance direction may occur on the surface of the sheet due to the rubbing on the sheet surface under a high contact pressure.

The change in the sheet surface texture may result in an image defect, such as image traces caused by the image formation unit. Such an image defect resulting from the change in the sheet surface texture occurs, for example, when, in the curved conveyance path, a filler, which is an inclusion of the sheet S, is pushed out of the surface of the sheet S due to the rubbing of the sheet S under a high contact pressure, which changes an electrical resistance on the surface of the sheet at the rubbed position. Thus, the sheet conveyed to the image formation unit downstream in the conveyance path is degraded in transfer property at the secondary transfer unit (i.e., the intermediate transfer belt 216 and the secondary transfer roller 217).

In this phenomenon, an electrical discharge occurs due to an excessive current flow, and the toner charge decreases or the charge polarity reverses in response to reception of the electrical discharge, resulting in degradation in the transfer property. In a case where this phenomenon occurs, some portions of the surface of the sheet may be degraded in transfer property due to the rubbing of the sheet and the other portions may not be degraded in transfer property, which causes differences in image density. These differences are recognized as image traces.

The contact pressure per unit area on the inner guide 6 is higher on a rib guide, having a guide shape, with a formed rib than on a surface guide which is to be in surface-contact with the sheet (while a contact pressure is higher on the rib guide than on the guide which has surface contact with the sheet). Adopting the rib guide enables reduction in the conveyance resistance but may cause an image defect by the image formation unit.

On the other hand, it is desirable that a guide with a surface shape be used rather than the rib guide in order to reduce the contact pressure.

One of causes of a high contact pressure on the inner guide 6 is a tension applied to the conveyed sheet S. As described above, a tension is applied to the sheet S due to the pulling of the sheet S by the withdrawal conveyance roller pairs 9. In particular, a large tension is applied to the sheet S in a region surrounded by inter-roller end lines L2 (including on the lines) illustrated in FIG. 3.

Figure 2:
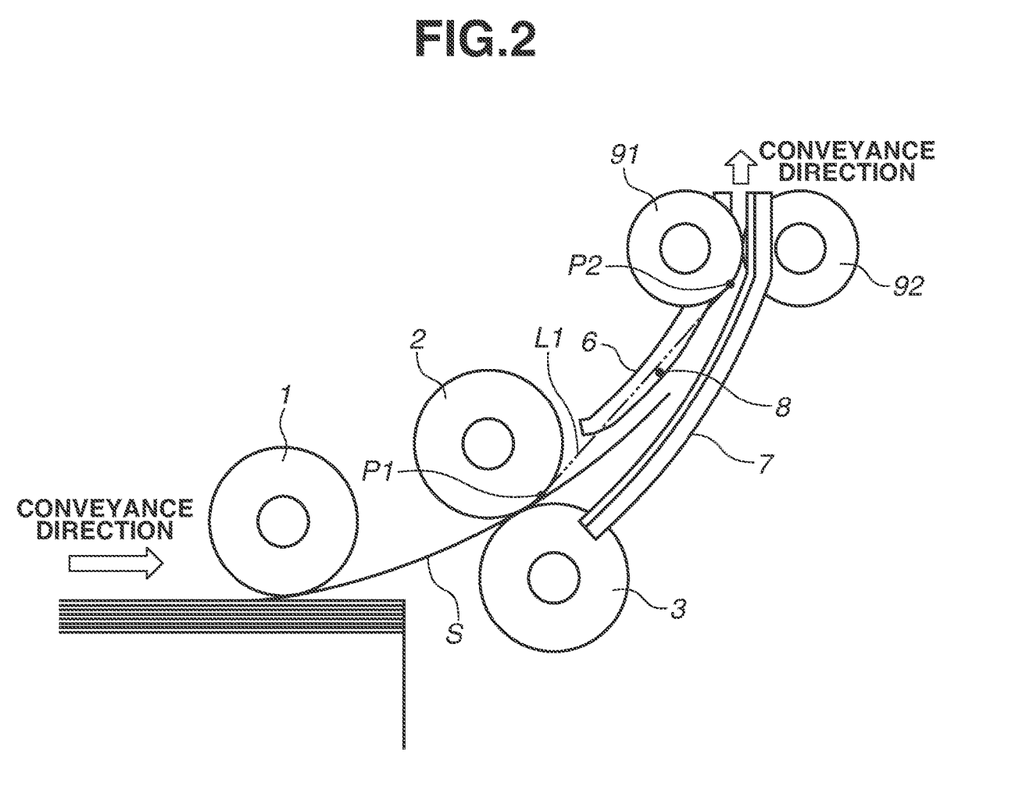
FIG. 2 is a front sectional view of an inner guide, an external common tangent, and an inner guide overhang part according to the first exemplary embodiment.
Figure 3:
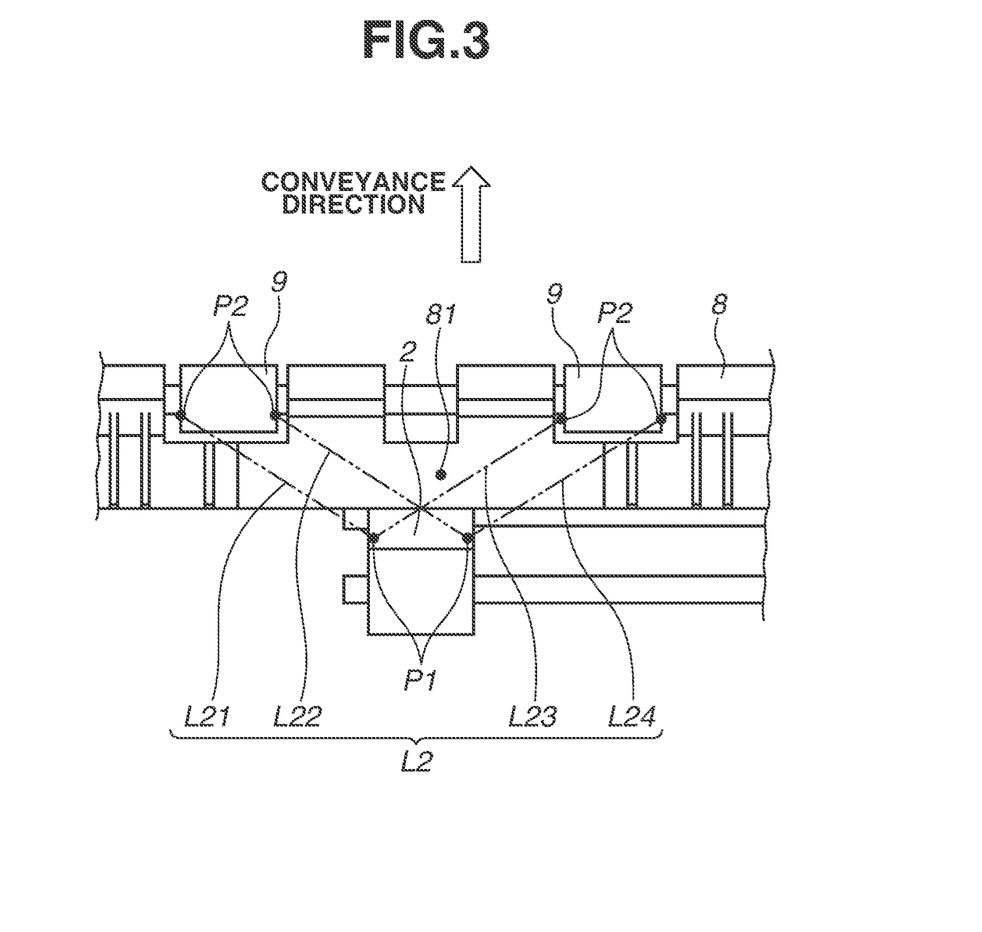
FIG. 3 is a side view of the inner guide according to the first exemplary embodiment.

FIG. 3 is a diagram illustrating the curved conveyance path viewed from the lateral side of FIG. 2. In the present exemplary embodiment, two withdrawal conveyance roller pairs 9 (each pair is formed by the withdrawal driving roller 91 and the withdrawal driven roller 92) are provided in a thrust direction (axial direction). In other words, the two withdrawal driving rollers 91 are attached to the shaft with a space left in between in the thrust direction. Similarly, the two withdrawal driven rollers 92 are attached to the shaft with a space left in between in the thrust direction. The number of the separation conveyance roller pair 10 (the feed roller 2 and the retard roller 3) is one. The one feed roller 2 is provided in the center in the thrust direction.

In the present exemplary embodiment, the contact points at the thrust-direction ends of the feed roller 2 on the external common tangent L1 are designated as "upstream roller end contact points P1", which are first intersection points, and the contact points at the thrust-direction ends of the withdrawal conveyance roller pairs 9 on the external common tangent L1 are designated as "downstream roller end contact points P2", which are second intersection points. The lines connecting the upstream roller end contact points P1 and the downstream roller end contact points P2 are designated as roller end lines L2 (L21, L22, L23, and L24).

The tension on the sheet S is particularly high in the region surrounded by the roller end lines L2 of the roller pairs (including on the lines). In other words, the tension is high in the region between the roller end line L21 and the roller end line L24. The tension is higher between the roller end lines L21 and L22 and between the roller end lines L23 and L24 than the other areas.

For this area with a high tension, the contact pressure per unit area at the contact place on the sheet is to be decreased to reduce a change in the sheet surface texture. In order to reduce the contact pressure per unit area at the contact places, it is effective to adopt a guide with a surface shape rather than a guide with a rib shape to increase the contact area.

As described above, the contact pressure is high in the region surrounded by the roller end lines L2 (including on the lines) when the sheet is pulled by the withdrawal conveyance roller pairs 9.

Thus, in the present exemplary embodiment, a surface guide part 81 having a surface-guide shape is arranged in the inner guide overhang part 8 so as to cross the roller end lines L2 as illustrated in FIG. 3.

The surface-guide shape of the surface guide part 81, which crosses the roller end lines L2, varies depending on the curvature of the curved conveyance path, the type of the sheet to be conveyed, the degree of a condition for mutual pulling of the separation conveyance roller pair 10 and the withdrawal conveyance roller pairs 9. In the present exemplary embodiment, adopted is the surface guide shape that crosses the roller end lines L2 by a width of about 3 mm or more in the conveyance direction and the thrust direction. Thus, forming the surface guide in the region where the contact pressure on the sheet is high at the time of withdrawal controls a change in the surface texture of the sheet caused by the rubbing with the guide part, thus preventing an image defect.

In the present exemplary embodiment, a part corresponding to the surface guide part 81, having a surface shape, in the inner guide 6 is provided only in the region including the inter-roller end lines where the contact pressure is high, and rib guide parts 82 and 83, having a rib shape, where the contact areas are small are provided on the outer side of the surface guide part 81 in the thrust direction. This arrangement controls a change in the orientation of the sheet during conveyance to the withdrawal conveyance roller pairs 9 as well as an increase in the conveyance resistance.

The rib guide parts 82 and the rib guide parts 83 each have a width of 2 mm or less in the thrust direction. It is desirable that the amount of overhang of the respective rib guide parts 82 and 83 from the external common tangent L1 to the outer guide be equal to or smaller than the amount of overhang of the surface guide part 81.

Advantageous Effects of the Present Exemplary Embodiment

As described above, in the present exemplary embodiment, narrowing the guide gap in the curved conveyance path between the separation conveyance roller pair 10 and the withdrawal conveyance roller pairs 9 stables the orientation of the sheet and improves the geometrical characteristics. An increase in rubbing resistance caused by narrowing the guide gap in the curved conveyance path can be controlled by forming the rib guide parts 82 and 83, which have a rib-shape, on the surface of the inner guide 6.

Further, in the present exemplary embodiment, the region of the inner guide 6 where the contact pressure (rubbing pressure) is particularly high (the region surrounded by the roller end lines) when the sheet is rubbed with the inner guide 6 during the conveyance of the sheet by the withdrawal conveyance roller pairs 9 serves as the surface guide part 81, which is a guiding part having a surface shape. This enables a control of a change in the surface texture due to the rubbing pressure between the sheet and the conveyance guide. Consequently, the possibility of the occurrence of image traces resulting from a change in the sheet surface texture is reduced, thus preventing an image defect.

Figure 4:
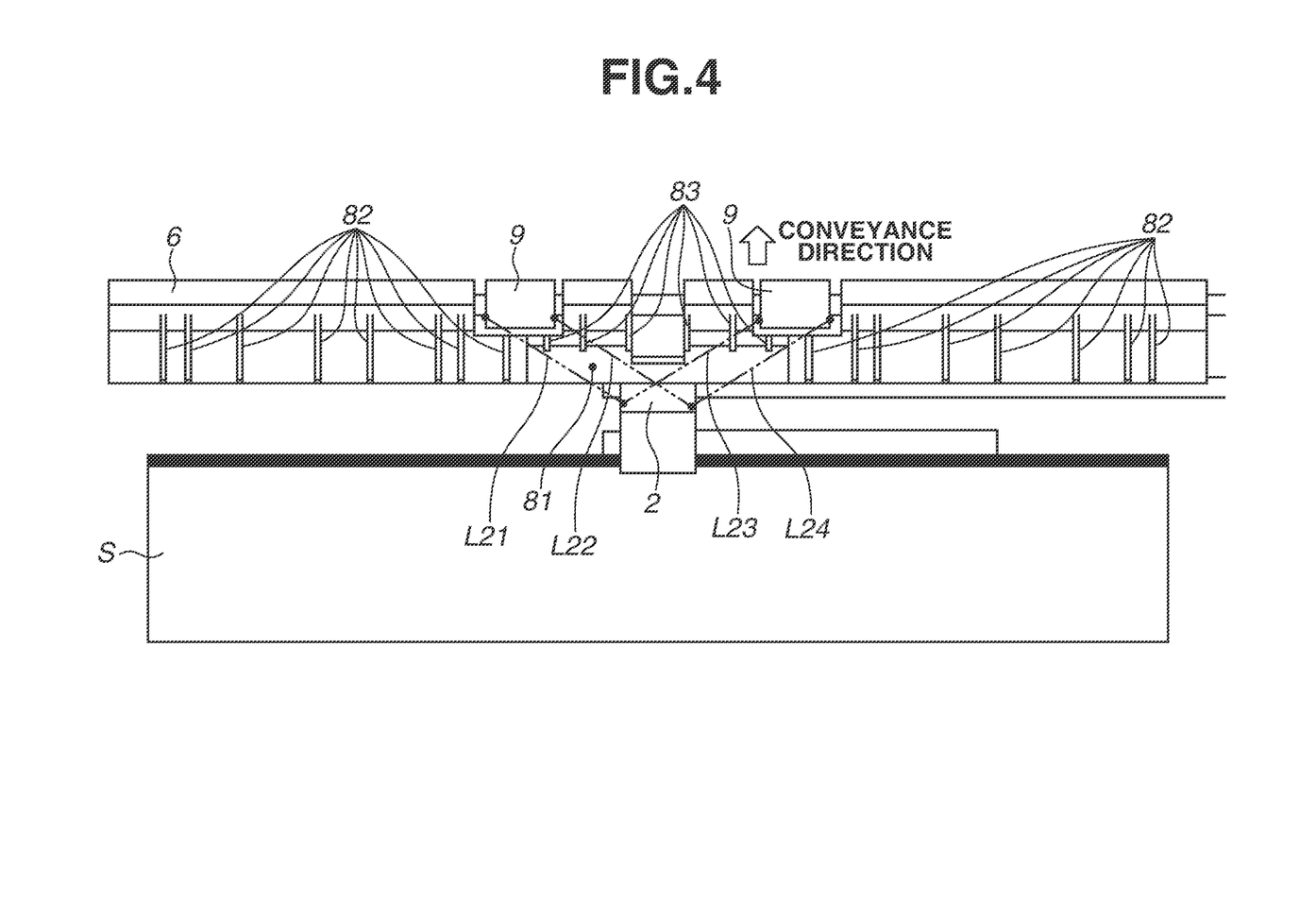
FIG. 4 is a side view of a surface guide and rib configuration according to a second exemplary embodiment.
Figure 5:
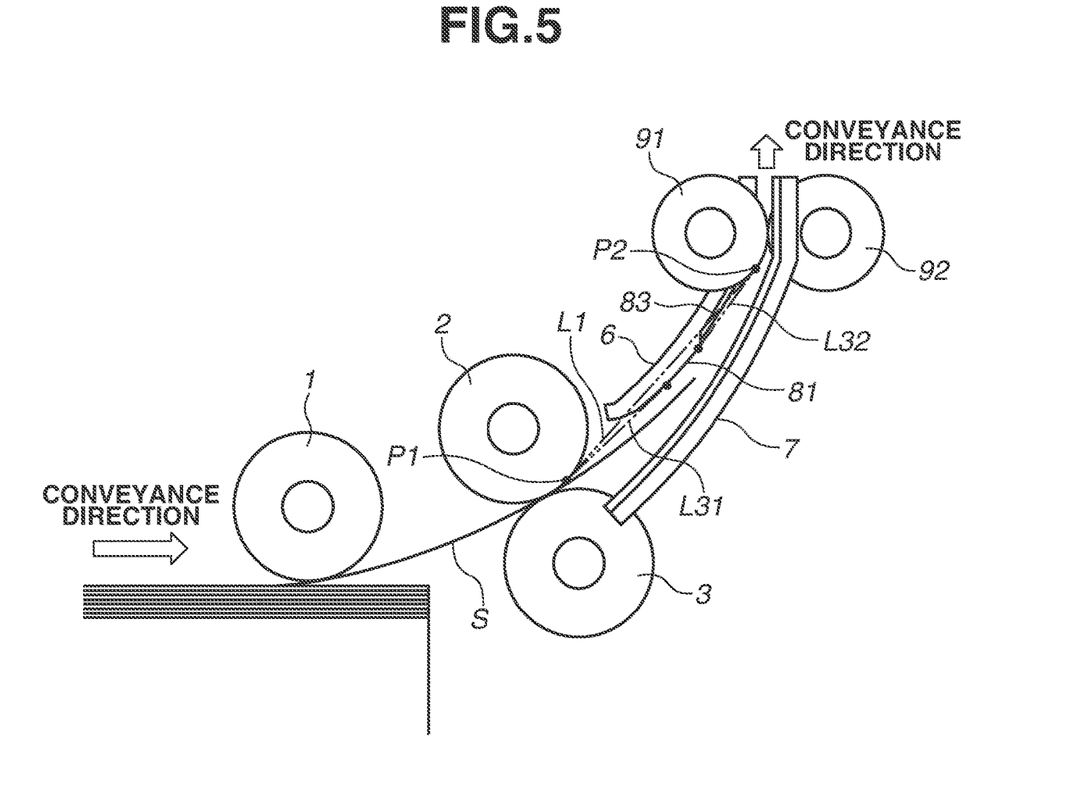
FIG. 5 is a front sectional view of an inner guide, an external common tangent, and an inner guide overhang part according to the second exemplary embodiment.

A second exemplary embodiment will be described with reference to FIGS. 4 and 5. As described above, a tension is applied to the sheet S due to the pulling of the sheet by the withdrawal conveyance roller pairs 9. In particular, a large tension is applied in the region between the roller end lines L21 and L24. In the inner guide overhang part 8 within the foregoing region, a portion overhanging more toward the outer periphery generates a higher contact pressure on the conveyed sheet S.

In contrast, the contact pressure is relatively low in a region of the inner guide overhang part 8 close to the inner peripheral side beyond an external guide common tangent L3, which is a collective designation of external common tangents L31 and L32, of the withdrawal driving roller 91 and the feed roller 2.

As a countermeasure against a change in the sheet surface texture, since the area of the overhang part inside the surface guide is sufficient as long as a pressure that causes no change in the sheet surface texture is obtained, the inner guide may have a surface only in the region where the contact pressure is higher than the other areas.

For example, in order to form a surface guide in the region where the contact pressure is higher than the other area, the guide part may have a rib shape as in the rib guide part 83, rather than a surface guide shape, in the region on the inner peripheral side beyond the downstream guide external common tangent L32 of the withdrawal conveyance roller pairs 9 and the inner guide overhang part (FIG. 5), and may have a surface guide shape on the upstream side.

(Example of Similar Effective Shape)

A similar arrangement may be made for a region on the inner peripheral side beyond the upstream guide external common tangent L31 of the upstream conveyance roller pair and the inner guide overhang part.

(Variations)

In order to obtain advantageous effects similar to those in the exemplary embodiments described above, the material for the overhang part of the inner guide may be different from that of the other guide parts. The overhang part of the inner guide may be separate from the other guide parts. The surface guide shape of the overhang part of the inner guide may or may not have a continuously connected surface.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-012467, filed Jan. 28, 2021, which is hereby incorporated by reference herein in its entirety.

What is claimed is:

1. An image formation apparatus comprising:
an image formation unit configured to form an image on a sheet;
a separation and feed roller pair configured to separate a plurality of sheets contained in a container one by one and feed the separated sheet;
a conveyance roller pair configured to convey the sheet delivered from the separation and feed roller pair to the image formation unit; and
a pair of conveyance guides disposed between the separation and feed roller pair and the conveyance roller pair in a sheet conveyance direction and forming a curved conveyance path for guiding the sheet,
wherein the pair of conveyance guides has an inner guide arranged on an inner peripheral side of the curved conveyance path and an outer guide arranged on an outer peripheral side of the curved conveyance path,
wherein the separation and feed roller pair has a feed roller arranged on the inner guide side of the curved conveyance path and configured to feed the sheet and a separation roller arranged on the outer guide side of the curved conveyance path and configured to contact the feed roller, separate the plurality of sheets one by one, and convey a sheet separated one by one,
wherein the conveyance roller pair has a driving roller arranged on the inner guide side of the curved conveyance path and configured to be driven by a drive source and a driven roller arranged on the outer guide side of the curved conveyance path and configured to contact the driving roller and follow rotation of the driving roller,
wherein, when viewed from a width direction of the sheet orthogonal to the sheet conveyance direction, a part of the inner guide overhangs toward the outer guide side from an external common tangent of the driving roller and the feed roller,
wherein, when viewed from the width direction of the sheet orthogonal to the sheet conveyance direction, points of intersection with the feed roller on the external common tangent are designated as first intersection points and points of intersection with the driving roller on the external common tangent are designated as second intersection points, and
wherein, when viewed from the sheet conveyance direction and when both ends of the feed roller at the first intersection points in the width direction and both ends of the driving roller at the second intersection points in the width direction serve as vertexes, in an inner region on a guide surface of the inner guide formed by connecting the vertexes, the guide surface of the inner guide is linearly continuous in the width direction.

2. The image formation apparatus according to claim 1, wherein, when viewed from the sheet conveyance direction, an outer region of the inner guide, which is not the inner region, has a rib guide part having a rib shape extending in the sheet conveyance direction with a space in the width direction.

3. The image formation apparatus according to claim 2, wherein a surface guide part and the rib guide part of the inner guide overhang toward the outer guide beyond the external common tangent of the feed roller and the driving roller, and
wherein an amount of overhang of the surface guide part from the external common tangent toward the outer guide is equal to an amount of overhang of the rib guide part.

4. The image formation apparatus according to claim 1, further comprising a torque limiter configured to apply a load to rotation of the separation roller in the width direction of the sheet.

5. The image formation apparatus according to claim 1, wherein the driving roller has first and second driving rollers that are spaced in the width direction of the sheet and form a nip together with the driven roller, and
wherein a distance between the first intersection points on the feed roller in the width direction of the sheet is shorter than a distance between the second intersection points of the first driving roller in the width direction of the sheet and is shorter than a distance between the second intersection points of the second driving roller in the width direction of the sheet.

6. The image formation apparatus according to claim 1, wherein, while the sheet is being sandwiched between the separation and feed roller pair and the conveyance roller pair and is being conveyed, a drive force on the separation and feed roller pair is cut.

* * * * *